(12) United States Patent
Mehus et al.

(10) Patent No.: US 7,201,290 B2
(45) Date of Patent: *Apr. 10, 2007

(54) METHOD AND APPARATUS FOR MASS BASED DISPENSING

(75) Inventors: Richard J. Mehus, Richfield, MN (US); John E. Thomas, River Falls, MN (US); Thomas J. Batcher, Mendota Heights, MN (US)

(73) Assignee: Ecolab Inc., St. Paul, MN (US)

(*) Notice: Subject to any disclaimer, the term of this patent is extended or adjusted under 35 U.S.C. 154(b) by 168 days.

This patent is subject to a terminal disclaimer.

(21) Appl. No.: 10/437,257

(22) Filed: May 12, 2003

(65) Prior Publication Data

US 2004/0226961 A1    Nov. 18, 2004

(51) Int. Cl.
*G01G 13/00*    (2006.01)
(52) U.S. Cl. .................... 222/77; 422/255; 422/261
(58) Field of Classification Search ........... 222/77; 422/255, 261, 105, 251; 177/16
See application file for complete search history.

(56) References Cited

U.S. PATENT DOCUMENTS

| | | | |
|---|---|---|---|
| 33,861 A | 12/1861 | Whitney | |
| 2,333,791 A | 11/1943 | Hutchinson, Jr. | |
| 3,412,254 A | 11/1968 | Meyer-Doering et al. | |
| 3,526,334 A * | 9/1970 | Swett et al. | 220/23.83 |
| 3,743,598 A | 7/1973 | Field | |
| 3,754,871 A | 8/1973 | Hessel et al. | |
| 3,760,166 A | 9/1973 | Adams et al. | |
| 3,772,193 A | 11/1973 | Nelli et al. | |
| 3,774,056 A | 11/1973 | Sample et al. | |
| 3,826,113 A | 7/1974 | Noraas et al. | |
| 4,040,515 A | 8/1977 | Hessel | |
| 4,046,996 A | 9/1977 | Williams et al. | |
| 4,199,001 A * | 4/1980 | Kratz | 137/268 |
| 4,211,517 A | 7/1980 | Schmid | |
| 4,241,400 A | 12/1980 | Kiefer | |
| 4,247,396 A | 1/1981 | Buesing | |
| 4,265,266 A | 5/1981 | Kierbow et al. | |
| 4,353,482 A | 10/1982 | Tomlinson et al. | |
| 4,396,828 A | 8/1983 | Dino et al. | |
| 4,402,426 A | 9/1983 | Faulkner et al. | |
| 4,404,639 A | 9/1983 | McGuire et al. | |
| 4,482,785 A | 11/1984 | Finnegan et al. | |

(Continued)

FOREIGN PATENT DOCUMENTS

DE    100 39 408 A1    12/2001

(Continued)

OTHER PUBLICATIONS

Presentation, "ECOLAB Aramark Uniform Services Joining Forces for Service Excellence".

(Continued)

*Primary Examiner*—Gladys JP Corcoran
*Assistant Examiner*—Sean Conley
(74) *Attorney, Agent, or Firm*—Shumaker & Sieffert, P.A.

(57) ABSTRACT

A method and apparatus for dispensing of a product based on weight as a load cell (22) which supports a structure holding the product (20a) to be dispensed. The weight of the product (20a) that is dispensed is determined by use of a controller (23).

21 Claims, 10 Drawing Sheets

U.S. PATENT DOCUMENTS

| | | |
|---|---|---|
| 4,509,543 A | 4/1985 | Livingston et al. |
| 4,573,606 A | 3/1986 | Lewis et al. |
| 4,597,091 A | 6/1986 | Blake |
| 4,630,654 A | 12/1986 | Kennedy, Jr. |
| 4,676,399 A | 6/1987 | Burckhardt |
| 4,690,305 A | 9/1987 | Copeland |
| 4,697,243 A | 9/1987 | Moore et al. |
| 4,707,848 A | 11/1987 | Durston et al. |
| 4,711,370 A | 12/1987 | Goudy, Jr. et al. |
| 4,756,321 A | 7/1988 | Livingston et al. |
| 4,766,548 A | 8/1988 | Cedrone et al. |
| 4,826,661 A | 5/1989 | Copeland et al. |
| 4,837,811 A | 6/1989 | Butler et al. |
| 4,845,965 A | 7/1989 | Copeland et al. |
| 4,848,381 A | 7/1989 | Livingston et al. |
| 4,858,449 A | 8/1989 | Lehn |
| 4,867,196 A | 9/1989 | Zetena et al. |
| 4,908,190 A | 3/1990 | Maglio et al. |
| 4,964,185 A | 10/1990 | Lehn |
| 4,969,011 A | 11/1990 | Faull et al. |
| 4,976,137 A | 12/1990 | Decker et al. |
| 4,980,292 A | 12/1990 | Elbert et al. |
| 4,999,124 A | 3/1991 | Copeland |
| 5,014,211 A | 5/1991 | Turner et al. |
| 5,014,877 A | 5/1991 | Roos |
| 5,036,479 A | 7/1991 | Prednis et al. |
| 5,038,807 A | 8/1991 | Bailey et al. |
| 5,043,860 A | 8/1991 | Koether et al. |
| 5,053,206 A | 10/1991 | Maglio et al. |
| 5,064,094 A | 11/1991 | Roos et al. |
| 5,136,281 A | 8/1992 | Bonaquist |
| 5,147,615 A | 9/1992 | Bird et al. |
| 5,203,366 A | 4/1993 | Czeck et al. |
| 5,219,224 A | 6/1993 | Pratt |
| 5,222,027 A | 6/1993 | Williams et al. |
| 5,240,326 A | 8/1993 | Evanson |
| 5,268,153 A | 12/1993 | Muller |
| 5,279,448 A | 1/1994 | Hanlin et al. |
| 5,283,639 A | 2/1994 | Esch et al. |
| 5,316,195 A * | 5/1994 | Moksnes et al. ......... 222/146.6 |
| 5,322,571 A | 6/1994 | Plummer et al. |
| 5,332,312 A | 7/1994 | Evanson |
| 5,345,379 A | 9/1994 | Brous et al. |
| 5,370,267 A | 12/1994 | Schroeder |
| 5,389,344 A | 2/1995 | Copeland et al. |
| 5,397,028 A | 3/1995 | Jesadanont |
| 5,400,018 A | 3/1995 | Scholl et al. |
| 5,404,893 A | 4/1995 | Brady et al. |
| 5,411,716 A | 5/1995 | Thomas et al. |
| 5,427,748 A | 6/1995 | Wiedrich et al. |
| 5,497,914 A | 3/1996 | Maltsis |
| 5,500,050 A | 3/1996 | Chan |
| 5,505,915 A | 4/1996 | Copeland et al. |
| 5,556,478 A | 9/1996 | Brady et al. |
| 5,580,448 A | 12/1996 | Brandreth |
| 5,584,025 A | 12/1996 | Keithley et al. |
| 5,584,079 A | 12/1996 | Wong et al. |
| 5,609,417 A | 3/1997 | Otte |
| 5,619,183 A | 4/1997 | Ziegra et al. |
| 5,625,659 A | 4/1997 | Sears |
| 5,625,908 A | 5/1997 | Shaw |
| 5,636,008 A | 6/1997 | LoBiondo et al. |
| 5,638,417 A | 6/1997 | Boyer et al. |
| 5,671,262 A | 9/1997 | Boyer et al. |
| 5,679,173 A | 10/1997 | Hartman |
| 5,681,400 A | 10/1997 | Brady et al. |
| 5,694,323 A | 12/1997 | Koropitzer et al. |
| 5,695,091 A | 12/1997 | Winings et al. |
| 5,724,261 A | 3/1998 | Denny et al. |
| 5,745,381 A | 4/1998 | Tanaka et al. |
| 5,757,664 A | 5/1998 | Rogers et al. |
| 5,758,300 A | 5/1998 | Abe |
| 5,761,278 A | 6/1998 | Pickett et al. |
| 5,762,096 A | 6/1998 | Mirabile |
| 5,769,536 A | 6/1998 | Kotylak |
| 5,777,895 A | 7/1998 | Kuroda et al. |
| 5,821,523 A | 10/1998 | Bunte et al. |
| 5,826,749 A | 10/1998 | Howland et al. |
| 5,827,486 A | 10/1998 | Crossdale |
| 5,839,097 A | 11/1998 | Klausner |
| 5,851,291 A | 12/1998 | Poterala et al. |
| 5,861,881 A | 1/1999 | Freeman et al. |
| 5,864,783 A | 1/1999 | Struck et al. |
| 5,875,430 A | 2/1999 | Koether |
| 5,885,446 A | 3/1999 | McGrew, Jr. |
| 5,887,975 A | 3/1999 | Mordaunt et al. |
| 5,897,671 A | 4/1999 | Newman et al. |
| 5,902,749 A | 5/1999 | Lichtwardt et al. |
| 5,931,877 A | 8/1999 | Smith et al. |
| 5,933,479 A | 8/1999 | Michael et al. |
| 5,939,974 A | 8/1999 | Heagle et al. |
| 5,945,910 A | 8/1999 | Gorra |
| 5,956,487 A | 9/1999 | Venkatraman et al. |
| 5,961,561 A | 10/1999 | Wakefield, II |
| 5,967,202 A | 10/1999 | Mullen et al. |
| 5,973,696 A | 10/1999 | Agranat et al. |
| 5,974,345 A | 10/1999 | Buck et al. |
| 5,975,352 A | 11/1999 | Spriggs et al. |
| 5,980,090 A | 11/1999 | Royal et al. |
| 5,992,686 A | 11/1999 | Cline et al. |
| 6,003,070 A | 12/1999 | Frantz |
| 6,029,286 A | 2/2000 | Funk |
| 6,049,792 A | 4/2000 | Hart et al. |
| 6,061,668 A | 5/2000 | Sharrow |
| 6,073,124 A | 6/2000 | Krishnan et al. |
| 6,082,149 A | 7/2000 | Woods |
| 6,098,843 A | 8/2000 | Soberanis et al. |
| 6,120,175 A | 9/2000 | Tewell |
| 6,129,449 A | 10/2000 | McCain et al. |
| 6,133,555 A | 10/2000 | Brenn |
| 6,136,184 A | 10/2000 | King |
| 6,164,189 A * | 12/2000 | Anson ........................ 99/281 |
| 6,167,358 A | 12/2000 | Othmer et al. |
| 6,220,312 B1 | 4/2001 | Hirsch et al. |
| 6,321,204 B1 | 11/2001 | Kazami et al. |
| 6,330,499 B1 | 12/2001 | Chou et al. |
| 6,356,205 B1 | 3/2002 | Salvo et al. |
| 6,357,292 B1 | 3/2002 | Schultz et al. |
| 6,370,454 B1 | 4/2002 | Moore |
| 6,377,868 B1 | 4/2002 | Gardner, Jr. |
| 6,418,371 B1 | 7/2002 | Arnold |
| 6,438,471 B1 | 8/2002 | Katagishi et al. |
| 6,463,940 B1 | 10/2002 | Thomas et al. |
| 6,472,615 B1 * | 10/2002 | Carlson ........................ 177/16 |
| 6,490,513 B1 | 12/2002 | Fish et al. |
| 6,547,097 B1 | 4/2003 | Cavallaro et al. |
| 6,697,706 B2 | 2/2004 | Gardner, Jr. |
| 6,707,873 B2 | 3/2004 | Thompson et al. |
| 6,987,228 B1 | 1/2006 | MacMichael et al. |
| 2001/0039501 A1 | 11/2001 | Crevel et al. |
| 2001/0047214 A1 | 11/2001 | Cocking et al. |
| 2001/0053939 A1 | 12/2001 | Crevel et al. |
| 2001/0054038 A1 | 12/2001 | Crevel et al. |
| 2002/0014496 A1 | 2/2002 | Cline et al. |
| 2003/0195656 A1 | 10/2002 | Gardner, Jr. et al. |
| 2003/0033156 A1 | 2/2003 | McCall |
| 2003/0033396 A1 | 2/2003 | McCall |
| 2003/0043688 A1 | 3/2003 | Peterson et al. |
| 2004/0015269 A1 | 1/2004 | Jungmann et al. |
| 2004/0088076 A1 | 5/2004 | Gardner, Jr. et al. |
| 2004/0162850 A1 | 8/2004 | Sanville et al. |
| 2004/0220844 A1 | 11/2004 | Sanville et al. |
| 2004/0226959 A1 | 11/2004 | Mehus et al. |
| 2004/0230339 A1 | 11/2004 | Maser et al. |

| | | |
|---|---|---|
| 2005/0065644 A1 | 3/2005 | Gardner, Jr. et al. |
| 2005/0102059 A1 | 5/2005 | Gardner, Jr. et al. |

FOREIGN PATENT DOCUMENTS

| | | | |
|---|---|---|---|
| DE | 10039408 A1 | * | 12/2001 |
| EP | WO 98/26704 | | 6/1998 |
| EP | WO 03/059143 A1 | | 7/2003 |
| GB | 0 252 251 A | | 5/1980 |
| JP | 06226068 | | 8/1994 |
| JP | 06226068 A | * | 8/1994 |
| JP | 09066995 | | 3/1997 |
| JP | 09066999 | | 3/1997 |
| JP | 11156101 | | 6/1999 |

OTHER PUBLICATIONS

T-Jet 2000 PC "Wash-Aisle Productivity Manager Software Guide", ECOLAB Textile Care Division, 28584/4001/0399 (9207-4327) Sample Reports consisting of 10 pages.
Sample Reports, Novalink System, 96-04620-00A, consisting of 8 pages.
Nova Controls, Nova News, "Save Money and Gain Sales Features?".
Novalink Overview Program Pricing.
Orion Liquid Laundry Supply Dispenser.
Novalink Laundry Information System, "ControlMaster Version 2.0 for Windows User's Guide".
PerSyst Inc. "LDAS-2000 Remote Information Control and Management System for the Commercial Laundry and Vending Industry".
PerSyst Inc. "Dial-A-Wash Automatic Laundry Room Attendant for Apartment and Complex Laundry Rooms".
iNtOUCH Water Treatment Information Management Solution Statement of Work Presented to; ECOLAB (draft form), Mar. 29, 1999.
Brochure, NOVALINK, "The Laundry Information System" from Nova Controls.
Diverlog-L Enhanced "DLE—Production Summary Reports", Diversey.
Diverlog-L Enhanced "DLE—Set-up Report", Diversey.
Diverlog-L Enhanced "DLE—Single Cycle Reports", Diversey.
CLAX Diverflow System Advanced Central Dosing Technology For Laundries Sep. 10, 1999.
*We'd like to make a couple of things perfectly CLEAR*, Aquabalance Pool and Spa Management, Ecolab brochure, 1998 Ecolab Inc.
*White Paper*, ECOLAB Balancer. Com, MRE Jun. 4, 1997.
*relax.*We've Got Your Pool Concerns Under Control, ECOLAB Water Care Services, 1998 Ecolab, Inc.

* cited by examiner

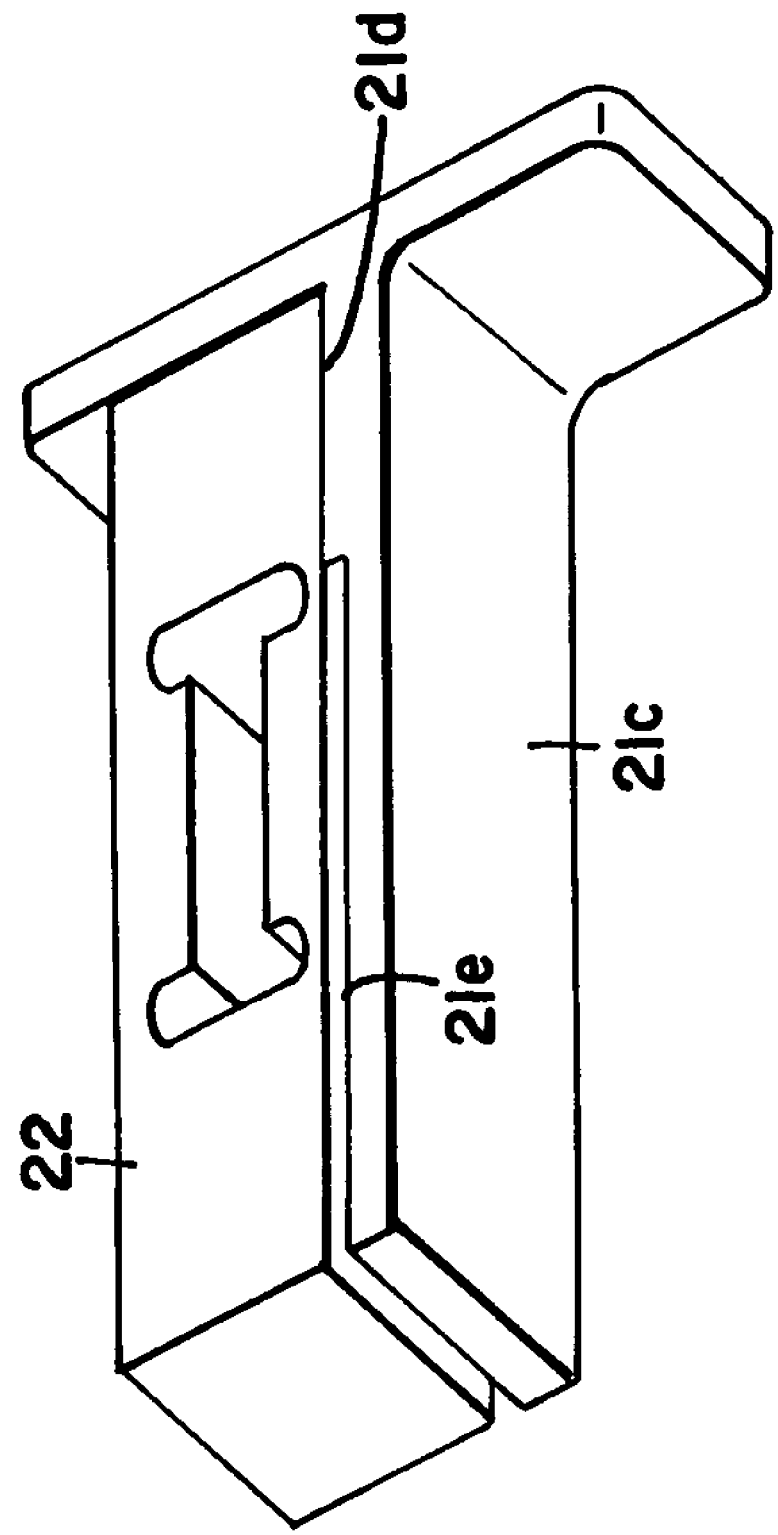

METHOD AND APPARATUS FOR MASS BASED DISPENSING

BACKGROUND OF THE INVENTION

1. Field of the Invention

This invention relates generally to dispensers and more particularly to a method and apparatus for dispensing a product based on mass.

2. Description of the Prior Art

Dispensers that utilize a diluent to erode a product, such as a detergent, are well known. The product being dispensed is typically a solid product and can take the form of either a solid block of chemical, pellets or a cast product. One example of such a dispenser is found in U.S. Pat. No. 4,826,661 by Copeland et al. This patent discloses a solid block chemical dispenser for cleaning systems. The dispenser includes a spray nozzle for directing a uniform dissolving spray on to a surface of a solid block of cleaning composition. The nozzle sprays on the exposed surface of the solid block, dissolving a portion of the block and forming a product concentrate. This is just one example of a dispenser that uses a diluent and further is just one example of the type of product that may be dispensed. It is recognized that there are many different dispensers which utilize diluents to erode and dispense a portion of a product, which may have any number of forms.

Once the product is dispensed, it is often necessary to know how much of the product has been dispensed. There are at least two major types of systems that have been developed to determine the amount of product that has been dispensed. The first is based on the amount of time that the product is exposed to the diluent. While such systems are useful, the systems are more susceptible to changes depending upon the amount of product that is being exposed to the diluent, the pressure at which the diluent is supplied or the temperature at which the diluent is supplied. Therefore, in many applications, it is necessary to supply more product than what is actually required so it is known that a sufficient amount of product is supplied.

Another method that has been utilized is to test the conductivity of the concentrate solution to determine the amount of product that has been dispensed. Again, this system has its own unique problems such as the necessity of adding chemistry to the product to allow the dilute concentration to be tested. Further, the conductivity based dispensers typically require on/off cycling to achieve an asymptotic approach to the concentration set point. Conductivity is also influenced by product concentration as a function of temperature and total conductivity. Shielded cabling is often required for conductivity based dispensers.

The present invention addresses the problems associated with the prior art devices and provides for a method and apparatus for dispensing product based on mass.

SUMMARY OF THE INVENTION

In one embodiment, the invention is a dispenser for dispensing an amount of concentrate using a diluent to form a use solution. The dispenser includes a housing having a cavity. The cavity is adapted to receive the concentrate. The housing has an inlet, whereby diluent enters the cavity and erodes the concentrate to create a use solution. The housing has an outlet, whereby the use solution exits the cavity. A product holder is positioned to support the concentrate in the cavity of the housing. A scale is also provided. A support member has a first end and a second end. The first end is operatively connected to the scale and the second end is operatively connected to the product holder, wherein weight of the concentrate is determined.

In another embodiment, the invention is a dispensing system for dispensing an amount of concentrate using a diluent to form a use solution. The dispensing system includes a container for holding a concentrate, the container having an opening. A housing has a cavity that is adapted to receive the container. The housing has an inlet and an outlet. A nozzle is positioned proximate the inlet. An inlet conduit is operatively connected to the nozzle, whereby diluent is sprayed on the concentrate, through the opening in the container, eroding the concentrate and forming a use solution. A product holder is positioned in the cavity of the housing. A scale is also provided. A support member has a first end and a second end. The first end is operatively connected to the scale and the second end is operatively connected to the product holder, wherein weight of the concentrate is determined. An outlet conduit is operatively connected to the outlet of the housing, wherein the use solution exits the cavity of the housing.

In another embodiment, the invention is a method of dispensing an amount of concentrate into a use solution using a diluent to erode the concentrate. The method comprises adding the diluent to the concentrate. The weight of the concentrate is determined as the concentrate is being eroded by the diluent. The method further includes determining when the amount of concentrate has been dispensed to create the use solution based on the weight of the concentrate. Diluent is stopped being added to the concentrate when the amount has been eroded and any remaining use solution is dispensed.

In another embodiment, the invention is a method of dispensing an amount of an ingredient from a dispenser having a holding device for holding the ingredient. The method includes dispensing the ingredient from the dispenser. The holding device, ingredient and any diluent on the ingredient are weighed as the ingredient is dispensed from the dispenser. It is then determined when the amount of the ingredient has been dispensed from the dispenser based on the weight of the holding device, the ingredient and any diluent and dispensing of the ingredient is stopped.

In another embodiment, the invention is a dispenser for dispensing an amount of concentrate using a diluent to form a use solution. The dispenser has an inlet conduit for providing the diluent to the concentrate to erode the concentrate and form a use solution. A scale is provided for weighing the concentrate as the concentrate is being eroded by the diluent. A controller is used for determining when the amount of concentrate has been dispensed and the use solution by the diluent, based upon the weight of the concentrate.

In another embodiment, the invention is a dispenser for dispensing an amount of concentrate to form a dilute solution. The dispenser has a housing having a cavity, the cavity adapted to receive the concentrate. The housing has an outlet, whereby concentrate that has been eroded exits the cavity. A product holder is positioned to support the concentrate in the cavity of the housing. The dispenser includes a scale. A support member has a first end and a second end, the first end is operatively connected to the scale and the second end operatively connected to the product holder, wherein weight of the concentrate is determined.

In another embodiment, the invention is a method of dispensing an amount of ingredient from a dispenser having a holding device for holding the ingredient. The method includes eroding the ingredient to dispense that portion of the eroded ingredient from the dispenser. The holding device and ingredient are weighed after erosion. The amount of ingredient that has been dispensed is determined based on the weight of the holding device and ingredient.

BRIEF DESCRIPTION OF THE DRAWINGS

FIG. 10 is an enlarged perspective view of a portion of FIG. 1.

DETAILED DESCRIPTION OF A PREFERRED EMBODIMENT

Figure 1:
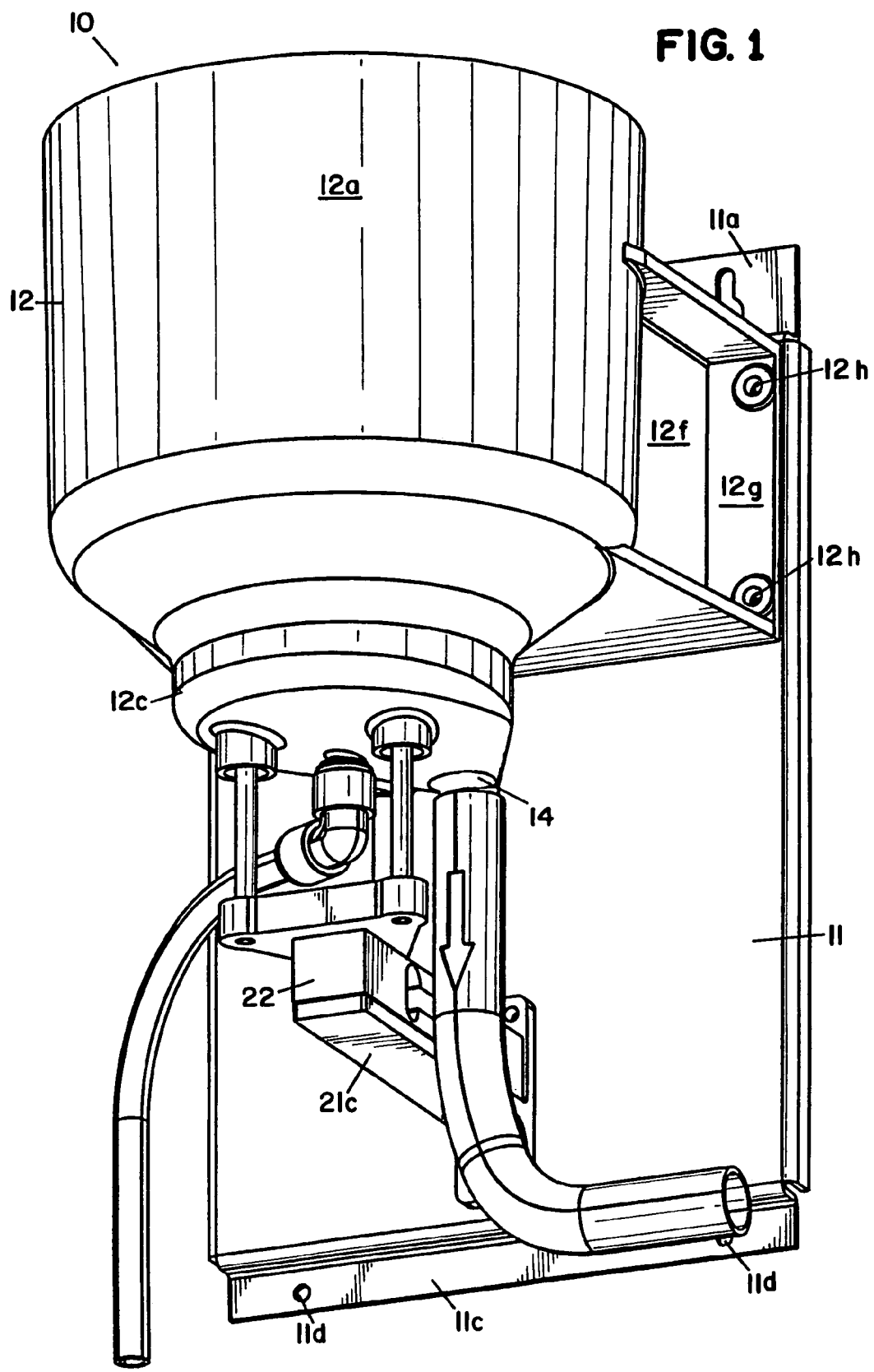
FIG. 1 is a perspective view, viewed generally from below, of the dispenser of the present invention.
Figure 2:
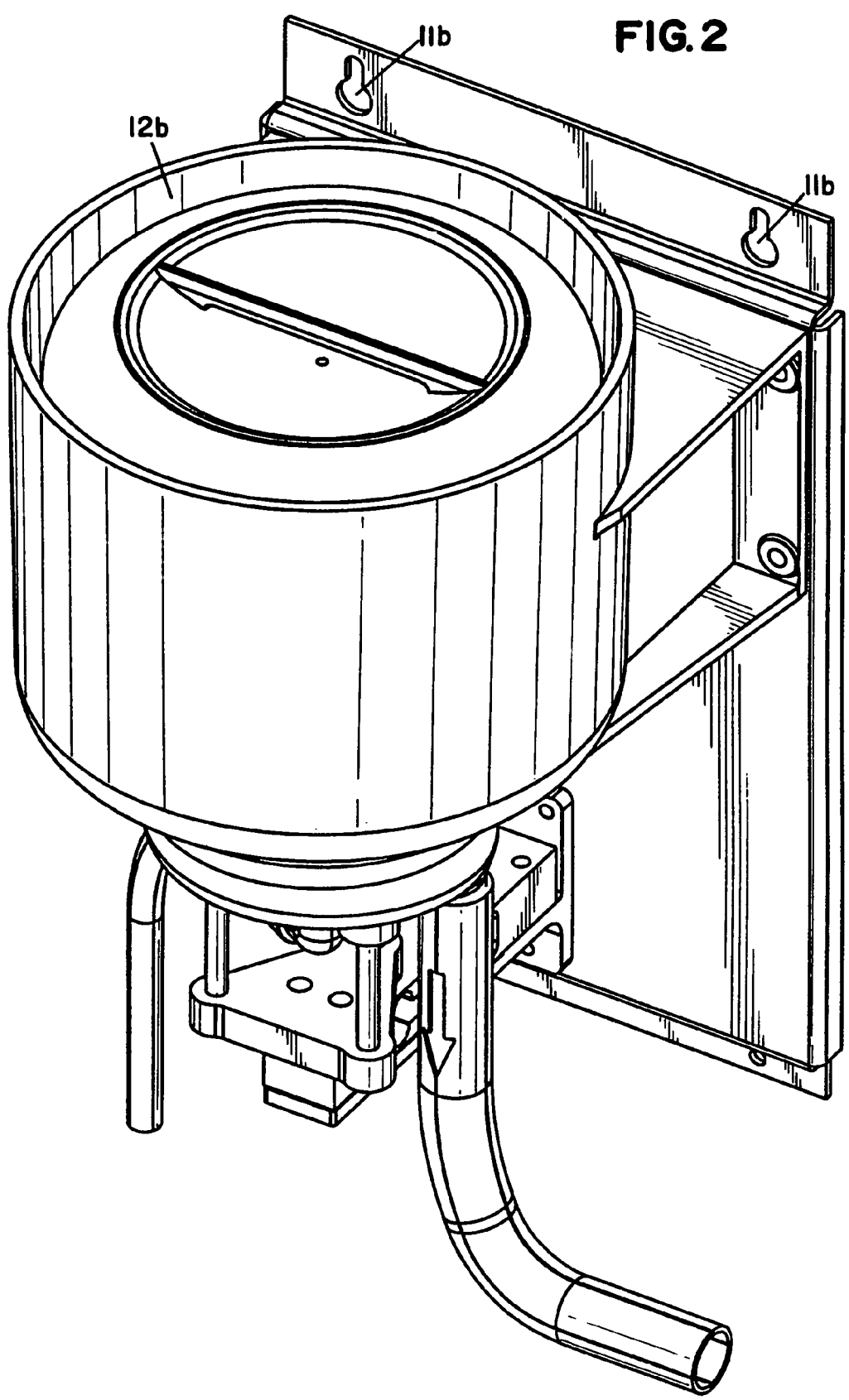
FIG. 2 is a perspective view, viewed generally from above, of the dispenser show in FIG. 1.

Referring to the drawing, wherein like numerals represent like parts throughout the several views, there is generally disclosed at 10 a dispenser. The dispenser 10 is shown mounted to a mounting panel 11 or other suitable mounting structure, which is suitable for mounting on a wall or other support surface (not shown). The support surface is typically a wall of a room, or a surface that is sturdy enough to support the dispenser 10. However, it is understood that the dispenser 10 may be mounted in various ways, well known in the art, including a free-standing dispenser. The mounting panel 11 is a support member and has a top flange 11a having two key way openings 11b. The openings 11b has a larger segment to allow the openings 11b to be placed over the head of a mounting bolt (not shown). The mounting bolt is secured into a mounting surface and the dispenser then drops down on the mounting bolt and is supported by the closed top of the openings 11b. A bottom flange 11c has two openings 11d, which are adapted to receive a fastener, such as a screw or bolt, to further fasten the mounting panel 11 to the mounting surface.

The dispenser 10 includes a housing 12 that is preferably molded as a one-piece plastic member, although it is understood that the housing 12 could be made out of other suitable material, such as stainless steel, and formed out of multiple pieces. The housing 12 has an outer wall 12a having a cavity 12b. The outer wall 12a has a larger diameter at the top so as to accommodate the capsule 20. The outer diameter of the outer wall 12a narrows at its base or sump region 12c. The sump region 12c, as will be described more fully hereafter, provides for a collection region for the use solution. The sump region 12c has an inlet 13 and an outlet 14. The inlet 13 is a cylinder that extends beyond the sump region 12c. The inlet has a bore 13a that provides for fluid communication into the cavity 12b. An inlet conduit, such as an inlet hose 15 has a first end 15a for connection to a diluent supply and a second end 15b which is operatively connected to a first end 16a of a connecting elbow 16. The second end 16b of the connecting elbow 16 is operatively connected to the inlet 13. The diluent is then able to enter the cavity 12b under pressure. A separate spray nozzle 30 may be utilized to further direct the diluent, as is well known in the art. The outlet 14 is an opening into the inner cavity 12b through which an outlet conduit, such as an outlet hose 17, is connected. This allows for the directing of the use solution to a desired location. The housing 12 has an upper flange 12d and a lower flange 12e. The flanges are connected by webs 12f, only one of which is shown, it being understood that a similar web is utilized on the left side of the dispenser 10, as viewed in the figures. A mounting member 12g extends between the flanges 12d, 12e and has two openings 12h through which a fastening member, such as a bolt, may be secured to secure the housing 12 to the mounting panel 11. A similar mounting member with openings is utilized on the left side of the dispenser, as viewed in the drawings.

Figure 4:
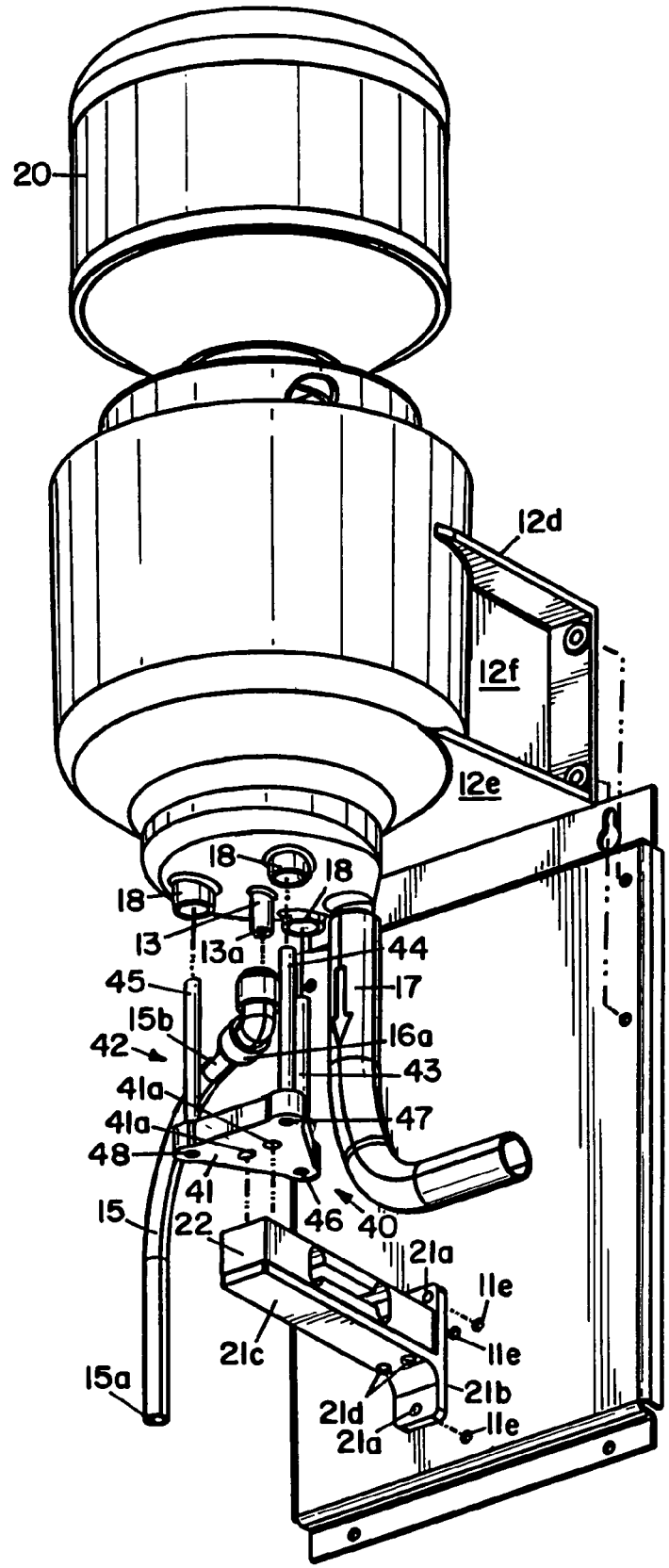
FIG. 4 is an exploded perspective view, viewed generally from below, of the dispenser shown in FIG. 1.

A support bracket 21 is operatively connected to the mounting panel 11 by suitable fastening means such as screws. The support bracket 21 is in a generally T-shape form and has three holes 21a formed in its base 21b. Only two of the holes 21a are shown in FIG. 4. FIG. 4 clearly shows where three holes 11e which are formed in the mounting panel 11. Appropriate fasteners, such as screws secure the bracket 21 to the panel 11 through three holes 21a and 11e. A support section 21c extends from the base 21b and provides for a support surface on which the load cell 22 is positioned. FIG. 10 is an enlarged perspective view of the support bracket 21 and load cell 22. The support section 21c has a top surface which is at two different heights. A first section 21d is a generally planar surface which supports the load cell 22. A second section 21e is a planar surface that is generally lower than the first section 21d and therefore is spaced from the load cell 22. The distance between the second section 21e and the load cell 22 is spaced at an appropriate distance, such as 150 percent of the maximum deflection of the load cell 22. The second section 21e therefore allows the load cell 22 to deflect downward. However, if the load cell 22 receives too large of a force, the second section 21e will limit the amount of deflection of the load cell 22.

The load cell 22 is secured to the support 21c of the support bracket 21 by any suitable method, such as screws (not shown), inserted through holes 21d. The type of load cell utilized would, of course, be dependent upon the weight to be measured. A typical weight of a capsule 20, with product, is between 8 to 10 pounds. Therefore, a 5 kilogram (11 pound) load cell was selected, although it is understood that other load cells would be selected depending upon the weight to be measured. One example of a suitable load cell is Load Cell Model RL-1521-5 kg provided by Rice Lake Weighing Systems, located at Rice Lake, Wis. As will be discussed more fully hereafter, a controller 23 having a keyboard 24 and a display 25 is connected to the load cell 22. The controller includes the necessary hardware and software to process the weight values detected by the load cell 22. The controller 23 may be any suitable controller. However, it has been found that a single chip scale such as SOC-3000/3001 by Cybertech Netanya Israel is easy to use. The single chip scale 23 includes the preamplifier, A/D Converter, display drivers, keyboard controller, serial communication, embedded CPU and field-programmable program and data memory.

Figure 3:
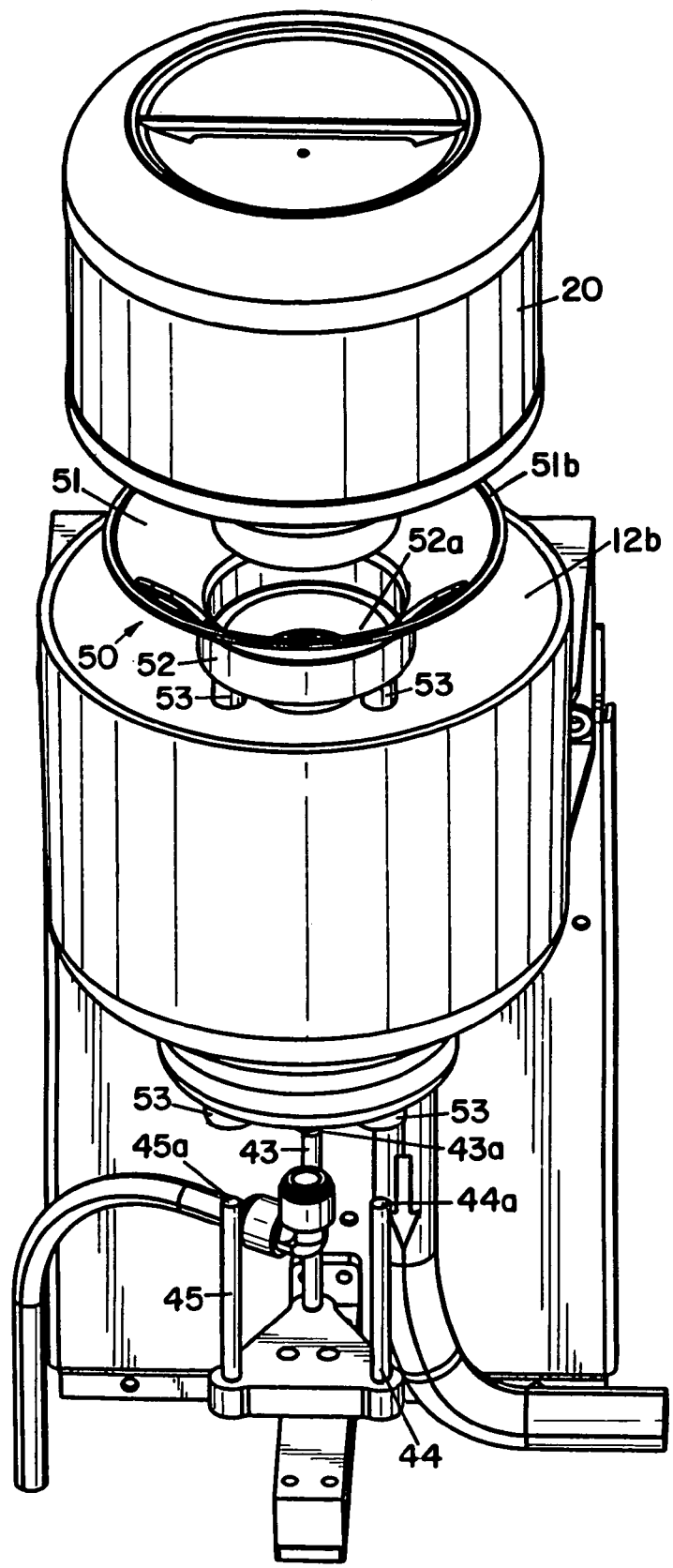
FIG. 3 is an exploded perspective view, viewed generally from above, of the dispenser shown in FIG. 1.
Figure 9:
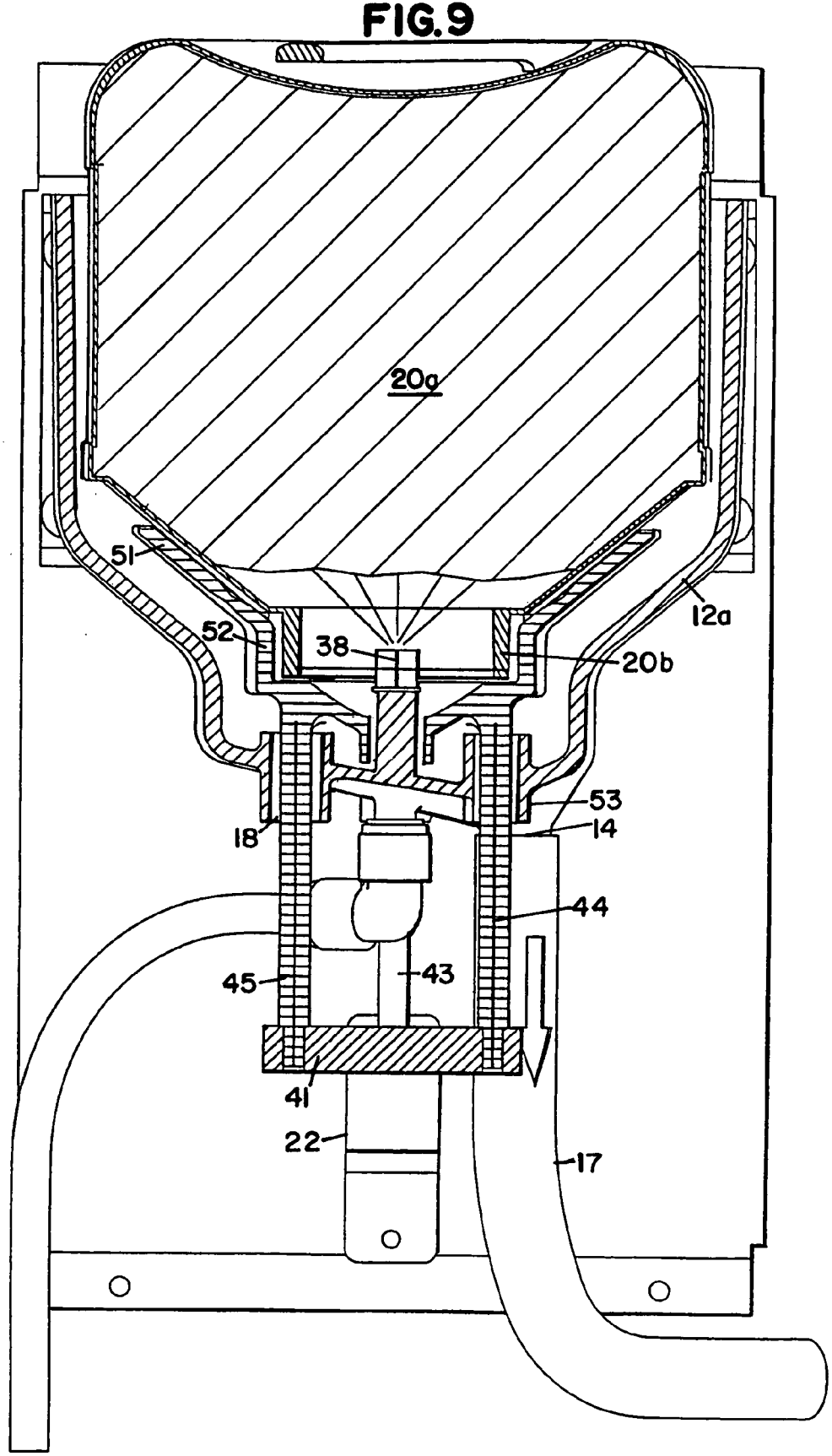
FIG. 9 is a cross-sectional view, taken generally along the lines 9—9 in FIG. 8, with a capsule.

Because the purpose of the load cell 22 is to determine the weight the product 20a inside the capsule or container 20 that is dispensed, the weight of the capsule 20 must be supported by the load cell 22. One structure for doing this is the use of a mounting bracket assembly, generally designated as 40, and a product holder 50. The mounting bracket assembly 40 has a triangular base 41. Two mounting holes 41a are formed therein and are used for fastening the base 41 to the load cell 42. Screws (not shown) are inserted through the holes 41a and into the load cell 22 to secure the base 41 to the load cell 42. A support arm, generally designated at 42, extends upward from the base 41. The support arm, in the embodiment shown, has three arm sections 43-45. The arm sections 43–45 are of sufficient structural strengths to support the product holder 50 and capsule 20. The arm sections 43–45 are secured to the base 41 by suitable means such as a friction fit in bores 46–48. The arm sections 43–45 extend through the support openings 18 at the bottom of the housing 12. The upper ends, 43a–45a of the arm sections 43–45 support the product holder 50. It is preferred, but not necessary, that the arms 43–45 and product holder 50 are a one-piece construction. The exploded views, FIGS. 3–4, show the arms 43–45 as not being integral with the product holder 50. This is for illustrative purposes only. Therefore, the actual construction is as shown in FIG. 9, wherein the arms 43–45 are integral with the product holder 50, however, it is understood that they may be made of a multiple piece-part construction. The product holder 50 has an upper, conically shaped member 51 in which three holes 51a are formed. The holes 51a are provided for making it easier to lift the product holder 50. The conical member 51 has a top rim 51b. The conical member 51 is operatively connected to a generally cylindrical section 52. The cylindrical section 52 has a bore 52a which is sized and configured to receive the neck portion 20b of the capsule 20. Three cylindrical projections 53 depend downward from the sump section 12c. Only two of the projections 53 are shown in FIG. 3, it being understood that the projections 53 are positioned to receive the arm sections 43–45. The cylindrical projections 53 have a bore 18 formed therein. Accordingly, the arms 43–45 of the product holder 50 are placed through the bores 18 and the arms 43–45 are secured, by suitable means, to the base 41. Then, when the capsule 20 is placed in the product holder 50, the weight of the capsule 20, the product inside of the capsule 20a, the product holder 50 and mounting bracket assembly 40 are all supported on the load cell 22.

The capsule 20 is shown as being generally cylindrical and having a neck 20b. The neck 20b forms an opening into which the product 20a is filled. A cap is then placed on the capsule 20 and the capsule is in condition for packaging and shipment. When the user utilizes the capsule 20, it is necessary to remove the cap so that the product 20a is exposed to the diluent spray. It is understood that other shapes and configurations may also be used, with the associated redesign of the dispenser to accommodate any different shapes or sizes. It is also understood that in addition to using different sized containers or capsules 20, the product holder could easily be redesigned to accept briquettes, powders or blocks of product that are not inside of a container. One way of doing so would be to have a screen across the product holder with walls or screens extending upward to hold the loose product. The dispenser would be designed such that the weight again is carried by the load cell 22. This would allow again, many different types of ingredients to be dispensed. Further, the dispenser 10 is shown as having a spray that sprays upward to erode the product 20a. It is also understood that other designs could utilize the present invention and have the diluent enter at other locations. It is also understood that the weight based system may be utilized to dispense a product that does not have to be eroded the product to be dispensed. The erosion may be by spray, as previously described, or by flooding. The product may also be ground away or drilled out by mechanical action. It is therefore seen that there are a number of ways to erode the product 20a. A preferred embodiment, and the way shown in the Figures, show the use of a diluent to dissolve the product 20a. However, the eroding of the product 20a may also take place by other mechanical methods, such as drilling or grinding.

The present invention has applicability in many areas in addition to those already discussed. The following is a list of at least some of the areas in which the invention may be used. In the area of pest elimination dispensing equipment, a load cell could be utilized to measure a pre-set amount of ready-to-use insecticide which would enable the user to document proof of delivery for regulatory compliance, while ensuring a consistent dose was used for each application. Use in the vehicle cleaning market could encompass the use of a chemical measurement device for a vehicle care product dispenser. The product could be in a solid, liquid or gel form. Delivery would be by conventional means such as a recirculating system for solid products or pump systems for liquids or gels. The load cell would measure precise weight changes in the product being delivered from a concentrate to create a ready-to-use solution or an intermediate solution that can be diluted at a user's convenience. The prior art procedures require chemical or volumemetric measurements by operators of product usage to ensure reproducible product delivery. As each product type varies greatly in chemical components for vehicle cleaning products, different chemical tests need to be developed and validated for each new product. Batch to batch variations in solid dissolution rates require very stringent quality control measures and greatly restrict new product development of solid systems. Large variations in product use temperature due to seasonal temperature variations in the vehicle cleaning market have negative effects on liquid product viscosities. Water pressure variations within vehicle cleaning sites result in wide changes in product delivery as many dilution systems are based on siphon technology. These variations often result in unacceptable differences in product delivery. All of the variations require human intervention to adjust the chemical delivery system. The use of the load cell technology would permit reproducible delivery of product regardless of chemical composition. This presents the possibilities of greater flexibility and product formulation. Concerns about variation in solid product solubility differences or liquid viscosity changes with temperature would be eliminated as only weight changes are measured. Simplicity of the dispenser design would also result as the same dispenser technology could be used for many product chemistries since chemical measurement systems do not need to be taken into account for each product.

Still another area where the present invention could be utilized is in the janitorial and health care areas. The janitorial business would be able to utilize the technology of the present invention for accurately dispensing two component chemistries as well as cross linking chemistries for floor care. For health care, the present invention would be able to be utilized for proof of delivery for sanitizers and disinfectants. There is also the need to deliver very accurate amounts of chemistry for instrument care and hard surface cleaning. The technology would be available for both liquid and solid products. The present invention is also applicable for Housekeeping. The invention is able to be utilized as a platform for accurate solid, liquid or concentrate proportioning when it is used in conjunction with a device that can quantify an amount of water passing through a pipe. For example, if a known volume of water is used, and the load cell could detect the amount of concentrate dispensed, a proportion would be known. So in an accurate dispenser of this kind, the user would set a proportion. While water is filling up the use vessel, the concentrate is dispensed. Dispensing the concentrate occurs until the proportion is satisfied. If a known amount of water is passed through a pipe in a fixed time, the dispenser could dispense the concentrate to satisfy the proportion. For example, if 100 milliliters of water is passed through the dispenser, a known amount of concentrate would be needed to satisfy the set proportion. The known amount of concentrate could be dispensed and stopped, when the load cell is satisfied.

The present invention is also applicable for laundry systems. Present laundry systems service two machines at a relatively high cost. The system is both complex and costly. The load cell technology of the present invention would reduce both the cost and complexity of a current laundry dispenser. Further, the current laundry system for liquid also has significant drawbacks in that there is no empty drum alarm and no way to compensate for the reduced output of the peristaltic pump dispensing. Load cell technology of the present invention would allow for accurate dispensing of the peristaltic pump over time, providing a signal of when to change the squeeze tube, and allow and empty warning device. These would be significant improvements over the prior art. The foregoing is not an exhaustive list but are just further examples of the applicability of the present invention.

Figure 6:
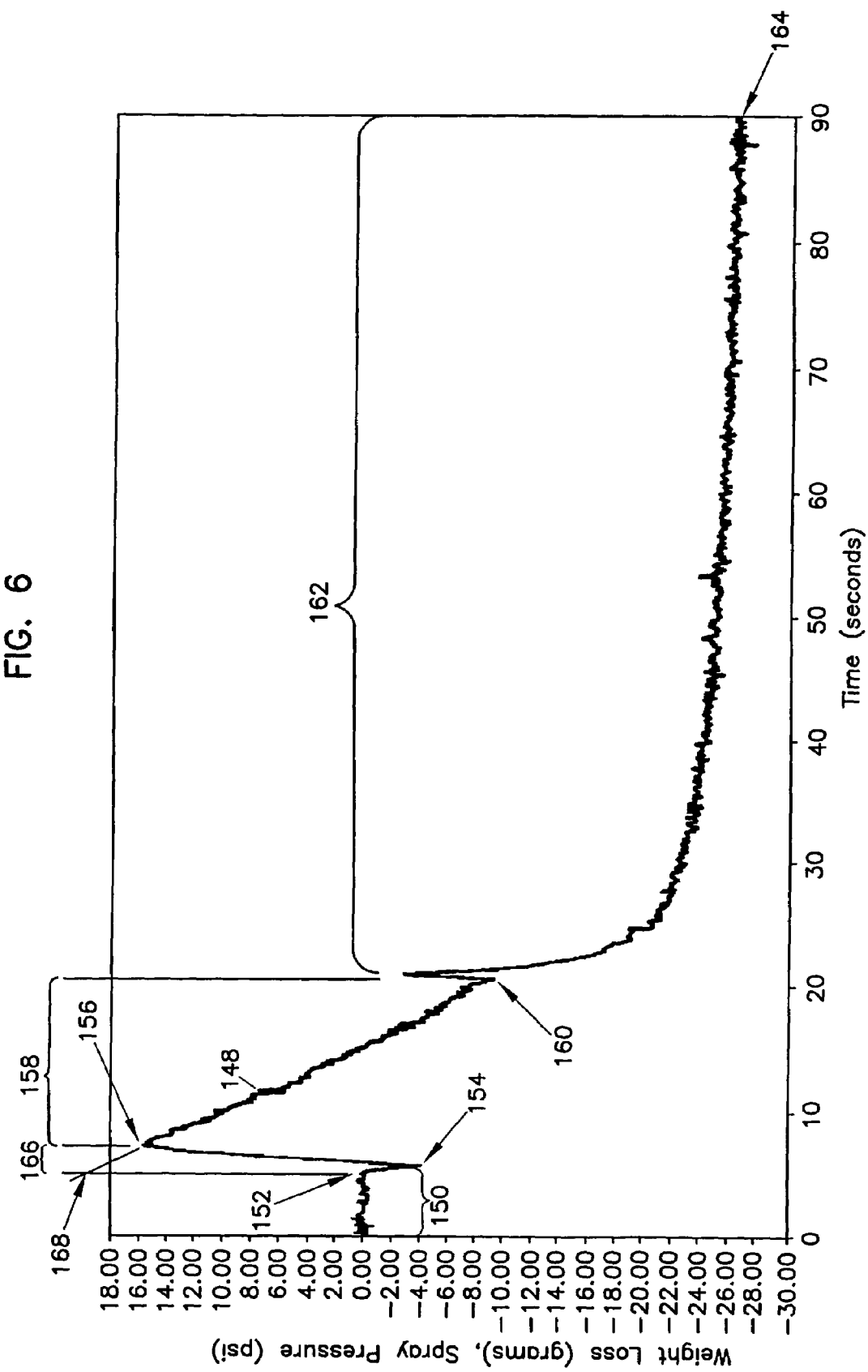
FIG. 6 is a chart illustrating the weight of a dispensing ingredient of the dispenser of FIG. 1.
Figure 7:
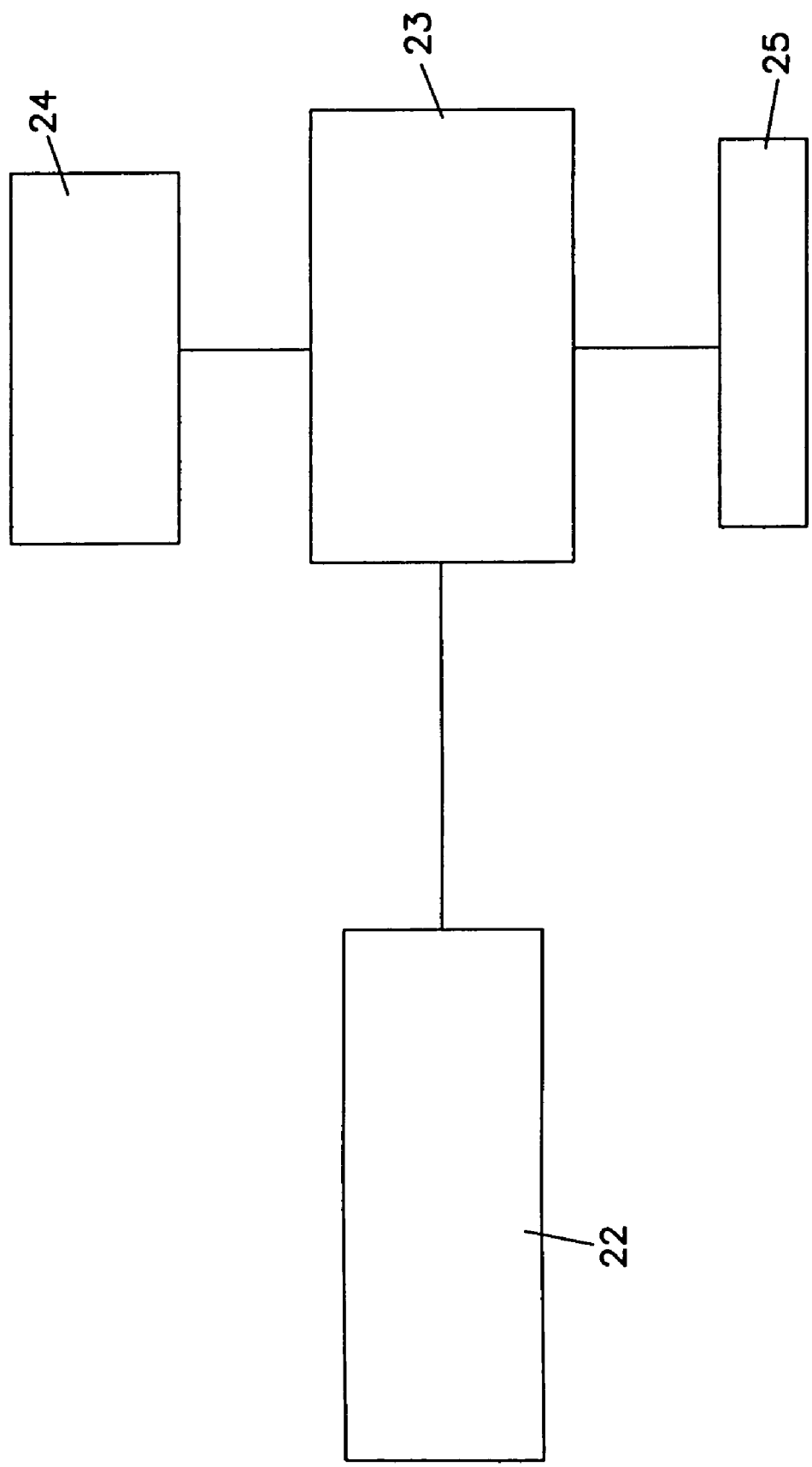
FIG. 7 is a schematic of a portion of the dispenser shown in FIG. 1.
Figure 8:
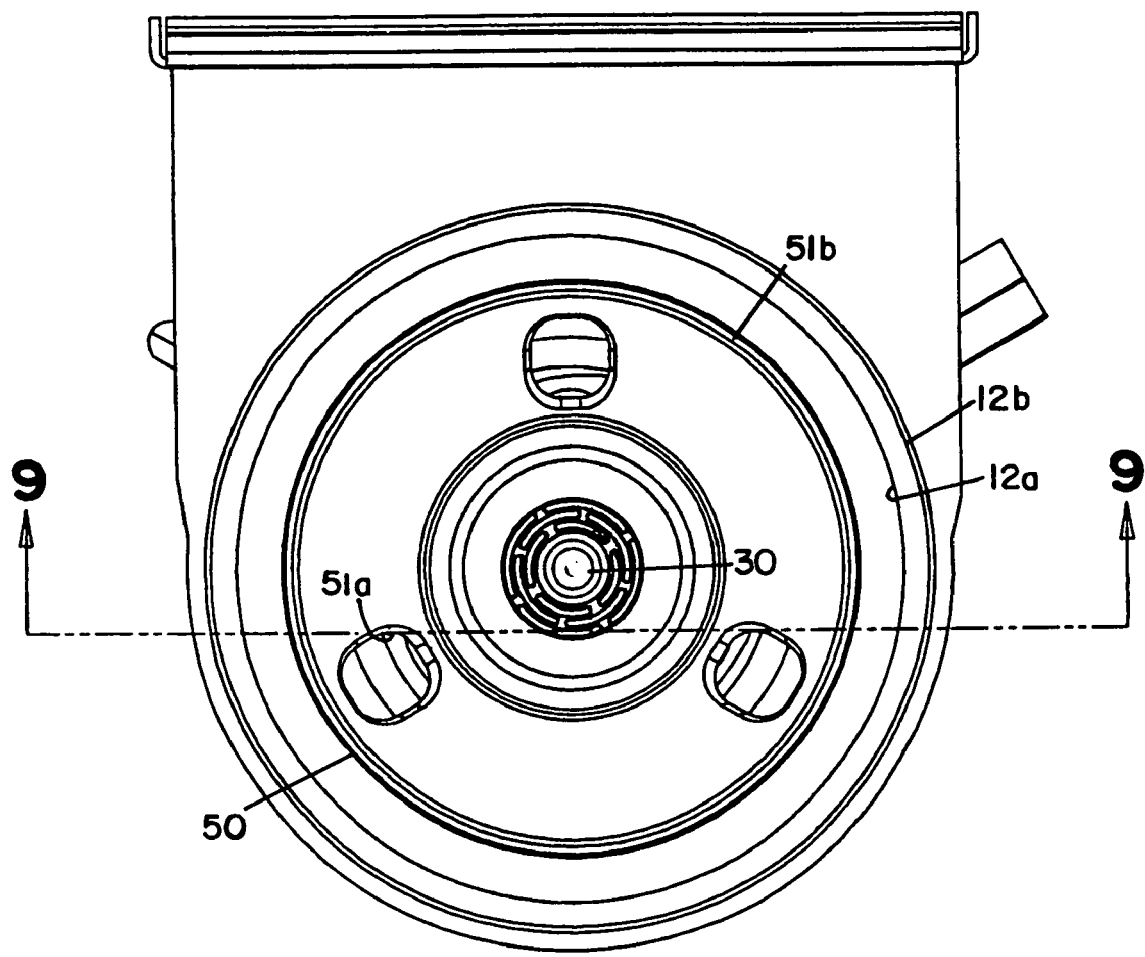
FIG. 8 is a top plan view of the dispenser shown in FIG. 1.

FIG. 6 is a chart illustrating the effect of the spray of diluent onto the block of ingredient in the dispenser of FIG. 1. The mantissa is time and the ordinate is weight in grams. Time 150 before the initiation of spray represents the starting combined weight, netted out at approximately zero (0) grams, for purposes of illustration. Spray is initiated at time 152 at which point two things begin to happen. First, pressure from the diluent sprayed on the underside of the block of ingredient relieves some of the combined weight from load cell 22. Second, the added weight from diluent accumulating in capsule 20 tends to cause an increased combined weight. Thus, the combined weight on load cell 22 initially decreases until time 154 at which point the combined weight reaches an initial minimum of approximately minus four (−4) grams. Following time 154, the added weight of the diluent in capsule 20 causes the combined weight to rather significantly increase. Over time, however, the added weight of the diluent in capsule 20 tends to stabilize as the block of ingredient is eroded. As the block of ingredient is eroded, its weight decreases. Thus, at time 156 the combined weight reaches a maximum at approximately sixteen (16) grams. Following time 156 the block of ingredient continues to be eroded as the diluent continues to spray. Since the added weight of the diluent in capsule 20 has stabilized, the combined weight continues to decrease during time 158 until the spray is discontinued. The spray of diluent is discontinued at time 160 causing a momentary weight gain for the combined weight as the upward pressure on the block of ingredient is discontinued. Following a momentary weight gain cause by the lack of upward pressure on the block of ingredient by the spray of diluent, diluent continues to drain from capsule 20 during time period 162 resulting in the near final weight at time 164 of approximately minus twenty-six (−26) grams.

The difference between the starting weight at time 150 of approximately zero (0) grams and the ending weight of approximately minus twenty-six (−26) grams, once the diluent has drained from capsule 20, of twenty-six (26) grams represents the amount of ingredient dispensed. However, note that the difference between the maximum weight of approximately sixteen (16) grams and the weight at time 160 of approximately minus nine (−9) grams when spray is discontinued is only twenty-five (25) grams. This is because ingredient was eroded from the block of ingredient during time 166, between time 152 when spray is begun and time 156 when the maximum is measured, and also during time 162 as diluent drains from capsule 20.

Figure 5:
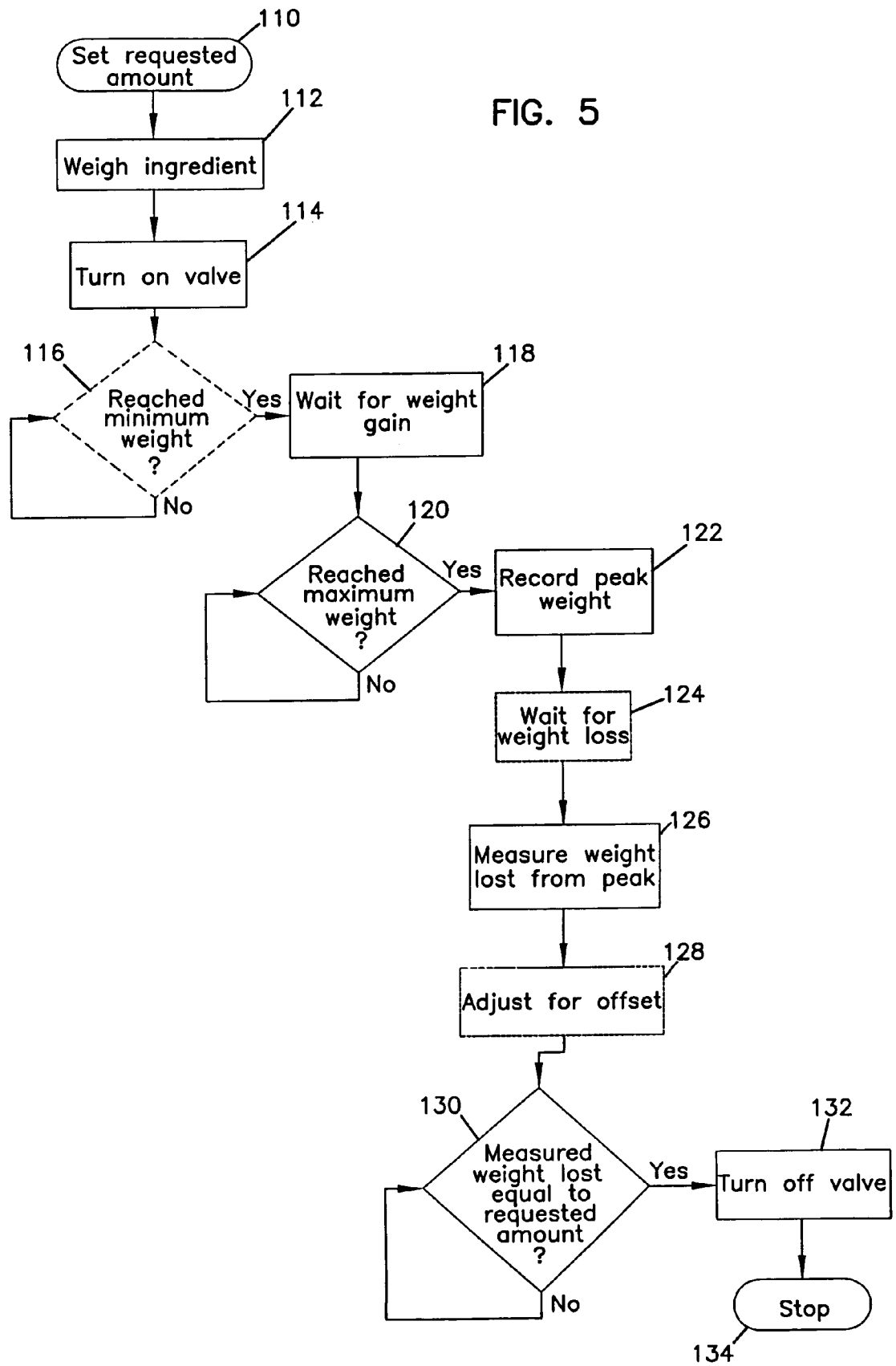
FIG. 5 is a flow chart illustrating an embodiment of the invention in which an ingredient is dispensed by eroding the ingredient with a diluent.

This process can be more readily understood with reference to the flow chart of FIG. 5. A requested amount of the ingredient requested is set (block 110). Load cell 22 weighs the ingredient (block 112). A valve is turned on (block 114) at time 152 initiating the spray of diluent against the block of ingredient. Optionally, the process waits (block 116) for a minimum weight at time 154 to be reached. The process waits (block 118) for diluent being added by spray to accumulate in capsule 20 and increase the combined weight. Note that if the step represented by block 116 is omitted, it is still proper to wait for weight gain in block 118. Alternatively, if the step represented by block 116 is not omitted then it is no longer necessary to wait for weight gain and the step represented by block 118. Alternatively, the steps represented by both blocks 116 and 118 could be omitted in the process could continue directly to block 120. In block 120, the method searches for a maximum combined weight at time 156 and, once found, records that peak weight (block 122). Again optionally, the process waits for weight loss (block 124). Load cell 22 measures (block 126) the amount of weight lost from the maximum or peak weight recorded. Optionally, the process adjusts for an offset (block 128) which is explained below. The process determines (block 130) whether the measured weight lost is equal to an amount which will result in a dispensed amount of ingredient which equals the requested amount. When such a determination is made, the valve is turned off (block 132) discontinuing the spray of diluent against the block of ingredient. The process stops (block 134) until the process is repeated by again setting a requested amount (block 110).

Since some ingredient will be eroded from the block of ingredient during time 166 (between time 152 when spray is initiated and time 156 when weight loss begins to be recorded) and during time 162 (while remaining diluent drains from capsule 20), the amount of weight lost from capsule 20 during time 158 does not necessarily equal the total weight of the ingredient eroded and, hence, dispensed. However, an amount of the ingredient which is additionally dispensed during time 166 and time 162 can be calculated and/or estimated by a variety of means. For example, this amount can be determined empirically from previous dispensed cycles. Alternatively, the slope of curve 148 during all or a portion of time 158 may be determined and an original maximum 168 may be determined by regression to account for an amount of the ingredient eroded during time 166. The amount of additional ingredient eroded during times 166 and 162 can be accounted for in the method in block 128 by adjusting the time 160 at which the spray of the diluent is discontinued. For example, if it is determined that the additional amount of the ingredient dispensed during time periods 166 and 162 is equal to approximately one (1) gram, then time 160 can be adjusted to turn off the spray of diluent when the measured weight loss is equal to the requested amount of ingredient minus one (1) gram.

The method of the present invention is described further in co-pending U.S. application entitled "Methods of Dispensing" filed on even date herewith by Richard Mehus et al and identified by attorney docket number 117-P-1758US01.

One issue in designing a mass-based dispenser is to protect the load cell from vertical shock load. One method of doing so is to use the support bracket 21 to prevent the load cell 22 from deflecting beyond its maximum. In addition, another way to further reduce the vertical shock load would be to isolate the capsule 20 from the product holder 50 as the capsule 20 is being loaded. This can be accomplished by using a cylinder within a cylinder concept. That is, an additional cylinder (not shown) would be added to the dispenser 10. The additional cylinder would be designed and configured to receive the capsule 20. However, as the cover (not shown in the figures, but which would sit on top of the housing 12) is raised, the cylinder would also raise. Then the capsule would be loaded into the cylinder and the capsule 20 would not be able to come into contact with the product holder 50. That is, the cylinder would prevent the capsule from going all the way down to the product holder. Then as the cover is lowered, the cylinder, holding the capsule 20, is lowered and allows the capsule 20 to rest on the product holder 50.

Another issue to consider in designing a load cell dispenser is to minimize the torque and to provide strain protection for the load cell. One way of addressing this issue is to align the forces above the load cell so that they are vertical onto the load cell 22. Also, by securing the housing 12 to the mounting panel 11 and securing the support bracket 21 to the panel 11, strain protection is provided. In addition, the skirt or housing will provide for load cell isolation so that the load cell 22 is not jarred or moved inadvertently by someone passing by or other sources of force which may contact the load cell 22.

Another issue to be considered is to prevent moisture from contacting the load cell 20. There are several ways of addressing this issue. One design would be to use a hood which would cover the dispenser 10 and prevent the load cell from becoming wet from splashes or sprays, if the dispenser 10 was being used in an environment where there could be sprays, such as from dishwashers. Coating the load cell 22 with a moisture protective coating may prove beneficial. Also, when the dispenser 10 is used as a spray up dispenser, as is the dispenser shown in this embodiment, having the tops of the support openings 18 extend above the bottom of the sump region prevents water or spray from readily going down the opening 18 on to the load cell 22.

Still another issue is the reduction of any vibration interference and the protection that provides for the same. One way of doing so is to electronically compensate for the vibration with logic in suitable software. Another solution is to physically isolate or insulate the dispenser 10 from the mounting surface. Industry standard cushioning materials such as air chambers or rubber may be utilized. This will assist in avoiding the resonate frequency.

In addition, there are other beneficial designs that may be incorporated into the dispenser 10. In instances where a capsule is not utilized, such as the use of a solid block of product, the actual shape of the product may be utilized to lock out the dispenser 10 to make certain that the right product is dispensed for the right dispenser. This would avoid, for example, putting a detergent block into a dispenser when a rinse aid should be in the dispenser. The products sold under the trademark GEOSYSTEM by Ecolab Inc. are one example of such products that may be used without a capsule. When a capsule is utilized, the packaging design of the capsule may be utilized to design lock-out systems to ensure that the right product is dispensed from the correct dispenser. Also, designs may be utilized that provide for electrical lock outs. Package identification systems such as radio frequency identification systems may be incorporated into the capsule 20, as well as bar codes which may be read electronically, to adjust the dispensing profiles based on the product sensed.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A dispenser for dispensing an amount of concentrate using a diluent to form a use solution, comprising:
   a) a housing having a cavity, the cavity adapted to receive a concentrate;
   b) the housing having an inlet, whereby diluent enters the cavity and erodes the concentrate to create a use solution;
   c) the housing having an outlet, whereby the use solution exits the cavity;
   d) a product holder positioned to support the concentrate in the cavity of the housing;
   e) a scale;
   f) a support member having a first end and a second end, the first end operatively connected to the scale and a second end operatively connected to the product holder, wherein weight of the concentrate is determined.

2. The dispenser of claim 1, wherein the scale is a load cell.

3. The dispenser of claim 2, further comprising a controller operatively connected to the load cell, wherein weight of the concentrate during a dispensing cycle is determined.

4. The dispenser of claim 3, wherein the controller is a single chip scale.

5. The dispenser of claim 1, further comprising:
   a) a support member;
   b) the housing operatively connected to the support member;
   c) a support bracket operatively connected to the support member; and
   d) the scale operatively connected to the support bracket.

6. The dispenser of claim 5, further comprising:
   a) a mounting bracket having a base operatively connected to the support bracket;
   b) a support arm having a first end operatively connected to the mounting bracket and a second end supporting the product holder; and
   c) the housing having an opening through which the support arm extends.

7. The dispenser of claim 6, further comprising:
   a) the support arm having at least three arm sections; and
   b) the product holder having at least three corresponding cavities adapted and configured to receive the arm sections, whereby the arm sections support the product holder.

8. The dispenser of claim 1, further comprising a mounting structure, the housing operatively connected to the mounting structure and the support member operatively connected to the mounting structure.

9. A dispensing system for dispensing an amount of concentrate using a diluent to form a use solution, comprising:

a) a container for holding a concentrate, the container having an opening;
b) a housing having a cavity, the cavity adapted to receive the container;
c) the housing having an inlet and an outlet;
d) a nozzle positioned proximate the inlet;
e) an inlet conduit operatively connected to the nozzle, whereby diluent is sprayed on the concentrate, through the opening in the container, eroding the concentrate and forming a use solution;
f) a product holder positioned in the cavity of the housing;
g) a scale;
h) a support member having a first end and a second end, the first end operatively connected to the scale and a second end operatively connected to the product holder, wherein weight of the concentrate is determined; and
i) an outlet conduit operatively connected to the outlet of the housing, wherein the use solution exits the cavity of the housing.

10. The dispensing system of claim 9, wherein the scale is a load cell.

11. The dispensing system of claim 10, further comprising a controller operatively connected to the load cell.

12. The dispensing system of claim 11, further comprising:
a) a support member;
b) the housing operatively connected to the support member;
c) a support bracket operatively connected to the support member;
d) the scale operatively connected to the support bracket;
e) a mounting bracket having a base operatively connected to the support bracket;
f) a support arm having a first end operatively connected to the mounting bracket and a second end supporting the product holder; and
g) the housing having an opening through which the support arm extends.

13. The dispensing system of claim 9, further comprising a mounting structure, the housing operatively connected to the mounting structure and the support member operatively connected to the mounting structure.

14. A dispenser for dispensing an amount of concentrate using a diluent to form a use solution, comprising:

a housing having a cavity adapted to receive the concentrate;
an inlet conduit in the housing that provides the diluent to the concentrate to erode the concentrate and form a use solution;
the housing having an outlet, whereby the use solution exits the cavity; a product holder positioned to support the concentrate in the cavity of the housing;
a scale that weighs the concentrate as the concentrate is eroded by the diluent; and
a controller that determines when the amount of concentrate has been dispensed in the use solution by the diluent, based upon the weight of the concentrate.

15. The dispenser of claim 14, wherein the scale is a load cell.

16. The dispenser of claim 15, wherein the controller is a single chip scale.

17. The dispenser of claim 16, further comprising the controller having a keyboard and a display.

18. A dispenser for dispensing an amount of concentrate to form a dilute solution, comprising:
a) a housing having a cavity, the cavity adapted to receive a concentrate;
b) the housing having an outlet, whereby concentrate that has been eroded exits the cavity;
c) a product holder positioned to support the concentrate in the cavity of the housing;
d) a scale; and
e) a support member having a first end and a second end, the first end operatively connected to the scale and a second end operatively connected to the product holder, wherein weight of the concentrate is determined.

19. The dispenser of claim 18, wherein the scale is a load cell.

20. The dispenser of claim 19, further comprising a controller operatively connected to the load cell, wherein weight of the concentrate during a dispensing cycle is determined.

21. The dispenser of claim 20, wherein the controller is a single chip scale.

* * * * *